(12) United States Patent
Corpus et al.

(10) Patent No.: US 11,300,162 B2
(45) Date of Patent: Apr. 12, 2022

(54) AXLE AND PROPELLER SHAFT QUICK-CONNECT JOINT ATTACHMENT ASSEMBLY

(71) Applicant: DANA AUTOMOTIVE SYSTEMS GROUP, LLC, Maumee, OH (US)

(72) Inventors: Christopher B. Corpus, Grand Rapids, OH (US); Marc T. Feichter, Perrysburg, OH (US); Terry M. Hammer, Fremont, IN (US); Bao T. Luong, Lambertville, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 595 days.

(21) Appl. No.: 16/311,252

(22) PCT Filed: Jun. 30, 2017

(86) PCT No.: PCT/US2017/040249
§ 371 (c)(1),
(2) Date: Dec. 19, 2018

(87) PCT Pub. No.: WO2018/009440
PCT Pub. Date: Jan. 11, 2018

(65) Prior Publication Data
US 2019/0242438 A1 Aug. 8, 2019

Related U.S. Application Data

(60) Provisional application No. 62/358,794, filed on Jul. 6, 2016.

(51) Int. Cl.
*F16D 1/116* (2006.01)
*F16D 3/38* (2006.01)
*F16D 1/10* (2006.01)

(52) U.S. Cl.
CPC .............. *F16D 1/116* (2013.01); *F16D 3/387* (2013.01); *F16D 2001/103* (2013.01)

(58) Field of Classification Search
CPC ...... F16B 21/18; F16B 21/183; F16B 21/186; F16D 1/116; F16D 3/387;
(Continued)

(56) References Cited

U.S. PATENT DOCUMENTS 1,756,335 A    4/1930  Bijur
1,923,399 A *  8/1933  Sharp .................... F16C 25/083
                                                    384/517

(Continued)

FOREIGN PATENT DOCUMENTS

DE    1008183    5/1957
DE    2703467    8/1978
(Continued)

OTHER PUBLICATIONS

European Patent Office, International Search Report with Written Opinion issued in PCT/US2017/040249, dated Sep. 13, 2017, 12 pages, European Patent Office, Rijswijk, Netherlands.

*Primary Examiner* — Josh Skroupa
(74) *Attorney, Agent, or Firm* — Marshall & Melhorn, LLC

(57) ABSTRACT

A joint assembly (10) including a female member (12), a male member (40) and a retaining member (60). The female member has a first axial end (18), a second axial end (20) and a cylindrical body portion (14) extending between the first axial end and the second axial end having a splined radially inner surface. The male member has a first axial end portion (42), a second axial end portion (46), and a splined tubular portion (44) extending between the first axial end portion and the second axial end portion. The retaining member (60) includes an annular portion and a plurality of attachment features defining an aperture. The second axial (Continued)

end portion of the male member has a circumferential groove (48) on the outer surface thereof. The second axial end portion of the male member extends through the aperture of the retaining member and the attachment features extend into the groove of the male member.

20 Claims, 4 Drawing Sheets

(58) Field of Classification Search
CPC ......... F16D 2001/103; Y10T 403/7033; Y10T 403/7075; Y10T 403/7182; Y10T 403/7188
USPC ............... 403/359.6, 376, 398, 399; 464/182
See application file for complete search history.

(56) References Cited

U.S. PATENT DOCUMENTS

| | | | |
|---|---|---|---|
| 2,325,460 | A | 7/1943 | Amberg |
| 2,844,013 | A | 7/1958 | Spence |
| 3,009,722 | A | 11/1961 | Augustin |
| 3,460,427 | A | 8/1969 | Baumgarten |
| 3,662,642 | A * | 5/1972 | Bernard ............... F16B 21/186 411/518 |
| 3,832,076 | A | 8/1974 | Gehrke |
| 3,969,033 | A | 7/1976 | Recker |
| 3,992,117 | A | 11/1976 | Ristau |
| 4,124,318 | A | 11/1978 | Sagady |
| 4,183,280 | A | 1/1980 | Hashimoto |
| 4,185,475 | A | 1/1980 | Faulbecker |
| 4,256,010 | A * | 3/1981 | Petrie ................. F16B 21/18 411/518 |
| 4,475,737 | A * | 10/1984 | Cook, Jr. ............. F16D 3/387 403/359.1 |
| 4,496,333 | A | 1/1985 | Cleveland |
| 4,540,386 | A | 9/1985 | Kaempf |
| 4,580,996 | A | 4/1986 | Brissette |
| 4,692,079 | A | 9/1987 | Killian |
| 4,813,808 | A | 3/1989 | Gehrke |
| 4,995,850 | A | 2/1991 | Van Der Drift |
| 5,060,750 | A | 10/1991 | Klages |
| 5,176,413 | A | 1/1993 | Westman |
| 5,352,079 | A | 10/1994 | Croskey |
| 5,536,101 | A | 7/1996 | Schwarzler |
| 5,665,001 | A | 9/1997 | Jacob |
| 5,779,551 | A | 7/1998 | Stall |
| 5,937,985 | A | 8/1999 | Dover |
| 6,183,370 | B1 | 2/2001 | Lim |
| 6,241,616 | B1 | 6/2001 | Lightcap |
| 6,390,926 | B1 | 5/2002 | Perrow |
| 6,582,151 | B2 | 6/2003 | Hopson |
| 6,780,114 | B2 | 8/2004 | Sahashi |
| 6,983,673 | B2 | 1/2006 | Bellich |
| 7,008,325 | B2 | 3/2006 | Bongartz |
| 7,314,416 | B2 | 1/2008 | Loughrin |
| 7,507,049 | B2 * | 3/2009 | Eidam ................. F16B 21/18 403/315 |
| 7,507,161 | B2 | 3/2009 | Worman, Jr. |
| 7,614,818 | B2 | 11/2009 | Gutierrez |
| 7,677,981 | B2 | 3/2010 | Zierz |
| 7,691,001 | B2 | 4/2010 | Lutz |
| 7,712,994 | B2 | 5/2010 | Cermak |
| 7,807,161 | B2 | 10/2010 | Yamamoto |
| 7,810,816 | B1 | 10/2010 | Halling |
| 7,867,099 | B2 | 1/2011 | Szentmihalyi |
| 7,896,749 | B2 | 3/2011 | Booker |
| 8,025,454 | B2 | 9/2011 | Cermak |
| 8,070,613 | B2 | 12/2011 | Cermak |
| 8,070,614 | B2 | 12/2011 | Szentmihalyi |
| 8,092,312 | B2 * | 1/2012 | Duncan ................. F16D 1/116 464/182 |
| 8,231,298 | B2 | 7/2012 | Szentmihalyi |
| 8,262,489 | B2 | 9/2012 | Valovick |
| 8,262,490 | B2 | 9/2012 | Langer |
| 8,277,330 | B2 | 10/2012 | Szentmihalyi |
| 8,308,577 | B2 | 11/2012 | Braun |
| 8,322,941 | B2 | 12/2012 | Cermak |
| 8,342,973 | B2 | 1/2013 | Lutz |
| 8,425,141 | B2 | 4/2013 | Disser |
| 8,425,142 | B2 | 4/2013 | Disser |
| 8,434,582 | B2 | 5/2013 | Bjoerck |
| 8,485,798 | B2 | 7/2013 | Sheth |
| 8,864,590 | B2 | 10/2014 | Sugiyama |
| 8,864,591 | B2 | 10/2014 | Sugiyama |
| 8,870,489 | B2 | 10/2014 | Langer |
| 8,882,602 | B2 * | 11/2014 | Line ................. F16D 3/387 464/133 |
| 9,097,287 | B2 | 8/2015 | Dine |
| 9,267,549 | B2 | 2/2016 | Dine |
| 9,388,860 | B2 | 7/2016 | Berube |
| 9,670,963 | B2 | 6/2017 | Metzger |
| 9,692,272 | B2 * | 6/2017 | Blaettner ............. F16C 35/067 |
| 10,151,352 | B2 * | 12/2018 | Creek ................. F16B 21/186 |
| 2006/0252557 | A1 * | 11/2006 | Schultze ............. F16D 3/385 464/130 |
| 2007/0149298 | A1 | 6/2007 | Wormsbaecher |
| 2008/0161119 | A1 | 7/2008 | Nishio |
| 2009/0110476 | A1 | 4/2009 | Patzelt |
| 2009/0233723 | A1 | 9/2009 | Kofuji |
| 2010/0026745 | A1 | 2/2010 | Kayahara |
| 2010/0190559 | A1 | 7/2010 | Duncan |
| 2010/0254754 | A1 | 10/2010 | Berube |
| 2011/0001652 | A1 | 1/2011 | Martino |
| 2014/0119810 | A1 | 5/2014 | Tinnin |
| 2015/0247604 | A1 | 9/2015 | McKinzie |
| 2017/0292570 | A1 | 10/2017 | Ketchel |
| 2018/0003240 | A1 | 1/2018 | Sugiyama |

FOREIGN PATENT DOCUMENTS

| | | | |
|---|---|---|---|
| DE | 3726135 | | 2/1989 |
| DE | 4109481 | | 10/1992 |
| DE | 4242940 | | 7/1993 |
| DE | 29501558 | | 3/1995 |
| DE | 102006026728 | | 12/2007 |
| DE | 202007014997 | | 2/2008 |
| DE | 102007026040 | | 12/2008 |
| DE | 102008031394 | | 3/2009 |
| DE | 102008028396 | | 7/2009 |
| DE | 102008009359 | | 8/2009 |
| DE | 102008009363 | | 8/2009 |
| DE | 102008009361 | | 9/2009 |
| DE | 102009017007 | | 10/2010 |
| DE | 102009019389 | | 11/2010 |
| DE | 102009020981 | A1 * | 11/2010 ............. F16D 1/116 |
| DE | 102013004324 | | 9/2013 |
| DE | 102013004826 | | 9/2013 |
| DE | 102014008719 | | 7/2015 |
| DE | 102014002731 | | 9/2015 |
| EP | 0275655 | | 7/1988 |
| EP | 1199488 | | 4/2002 |
| EP | 1288515 | | 3/2003 |
| EP | 2806180 | | 11/2014 |
| JP | 2008095843 | | 4/2008 |
| JP | 2010014257 | | 1/2010 |
| KR | 101321588 | | 10/2013 |
| WO | 2008148373 | | 12/2008 |
| WO | 2008154916 | | 12/2008 |
| WO | 2012003261 | | 1/2012 |

* cited by examiner

AXLE AND PROPELLER SHAFT QUICK-CONNECT JOINT ATTACHMENT ASSEMBLY

RELATED APPLICATION

This application is claiming the benefit of the U.S. Provisional Application No. 62/358,794 filed on Jul. 6, 2016, the entire disclosure of which is hereby incorporated by reference.

FIELD

A quick-connect joint assembly including a retaining member for securing a female splined member to a male splined member. In particularly, the retaining member is secured to the joint assembly connecting the female splined member to the male splined member without the use of tools, fasteners, or excessive assembly or disassembly forces.

BACKGROUND

A typical driveline for a motor vehicle includes conventional attachment components for connecting an engine transmission or transfer case to a propeller shaft and/or an axle to a propeller shaft or a half shaft. The conventional engine transmission or transfer case output includes a male splined member that is connected to the first end of a propeller shaft through conventional attachment components such as end yokes, companion flanges, flange yokes, outboard slip yokes, or armed rubber coupling flanges. These attachment components include cardan joints, constant velocity joints or a rubber couplings. Conventional securing mechanisms used include threaded fasteners, snap rings, or circlips. Similar connection components are used to connect the second end of a propeller shaft to the male splined input member of a front or rear drive axle and to connect one portion of a propeller shaft to an adjacent portion of a propeller shaft within a multi-piece propeller shaft.

The conventional securing mechanisms described above require a large amount of force and/or special tooling to securely assemble/disassembly the components. It would be desirable to have an improved joint assembly that securely attaches two components together without requiring the use of tools, fasteners, or excessive assembly or disassembly forces.

SUMMARY

Provided herein is a connecting joint assembly having a female member, a male member and a retaining member. The female member has a first axial end, a second axial end and a cylindrical body portion extending between the first axial end and the second axial end having a splined radially inner surface. The male member has a first axial end portion, a second axial end portion, and a splined tubular portion extending between the first axial end portion and the second axial end portion. The retaining member includes an annular portion and a plurality of attachment features extending radially inward from, and perpendicular to, the annular portion defining an aperture. The second axial end portion of the male member has a circumferential groove on the outer surface thereof. The second axial end portion of the male member extends through the aperture of the retaining member and the attachment features extend into the groove of the male member. The splined radially inner surface of the female member and the splined tubular portion of the male member meshingly engage with each other.

Provided herein is a connecting joint assembly having a female member, a male member and a retaining member. The female member has a first axial end, a second axial end and a cylindrical body portion extending between the first axial end and the second axial end having a splined radially inner surface. The male member has a first axial end portion, a second axial end portion, and a splined tubular portion extending between the first axial end portion and the second axial end portion. The retaining member includes an annular portion, a flat surface portion and a plurality of attachment features. The annular portion extends perpendicular to the flat surface portion along the radially outer edge thereof and the attachment features extend perpendicular to the flat surface portion along the radially inner edge thereof and define an aperture. The second axial end portion of the male member has a circumferential groove on the outer surface thereof. The second axial end portion of the male member extends through the aperture of the retaining member and the attachment features extend into the groove of the male member. The splined radially inner surface of the female member and the splined tubular portion of the male member meshing engage with each other.

BRIEF DESCRIPTION OF THE DRAWINGS

The above, as well as other advantages of the present embodiments, will become readily apparent to those skilled in the art from the following detailed description when considered in the light of the accompanying drawings in which:

FIG. 4b is a side view of the male splined member of FIG. 4a;

DETAILED DESCRIPTION OF THE PREFERRED EMBODIMENTS

Figure 1:
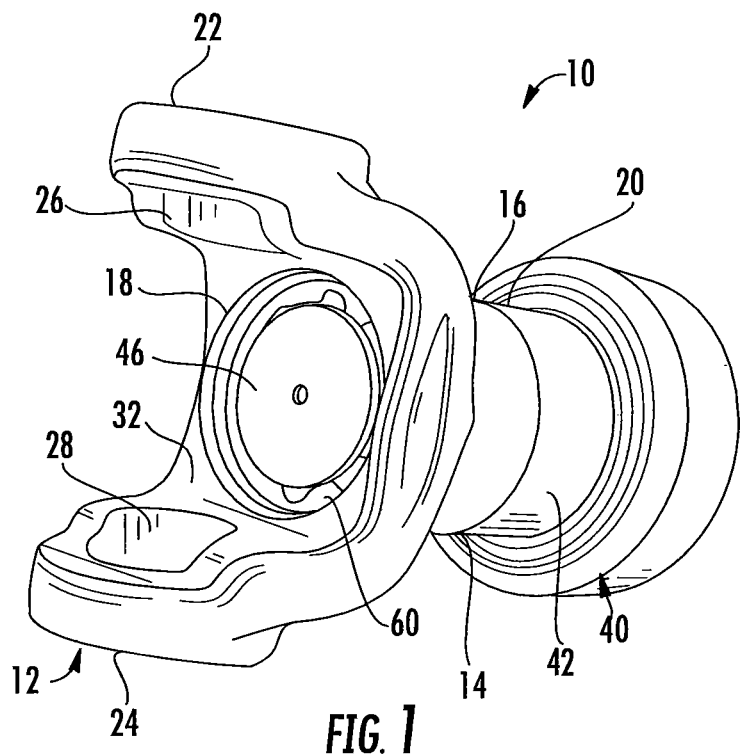
FIG. 1 is a perspective view of a preferred embodiment of a joint assembly.

It is to be understood that the invention may assume various alternative orientations, except where expressly specified to the contrary. It is also to be understood that the specific assemblies and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

The disclosure herein relates to a quick-connect joint assembly. The joint assembly will be described in connection with a universal joint for a vehicle. It would be understood by one of ordinary skill in the art that the various embodiments of the joint assembly described herein may have applications to on-highway or off-highway vehicles. Furthermore, it would be understood by one of ordinary skill in the art that these embodiments could have industrial, locomotive, and aerospace applications.

Referring now to the drawings, FIG. 1 depicts one embodiment of a quick-connect joint assembly 10. The joint assembly 10 includes a female member 12, a male member 40 and a retaining member 60. In some embodiments, as depicted in FIG. 1 the joint assembly 10 is an end yoke assembly where the female member 12 is an end yoke. The female member 12 can be made of rigid and durable materials including, but not limited to, iron, steel, and aluminum.

Figure 2:
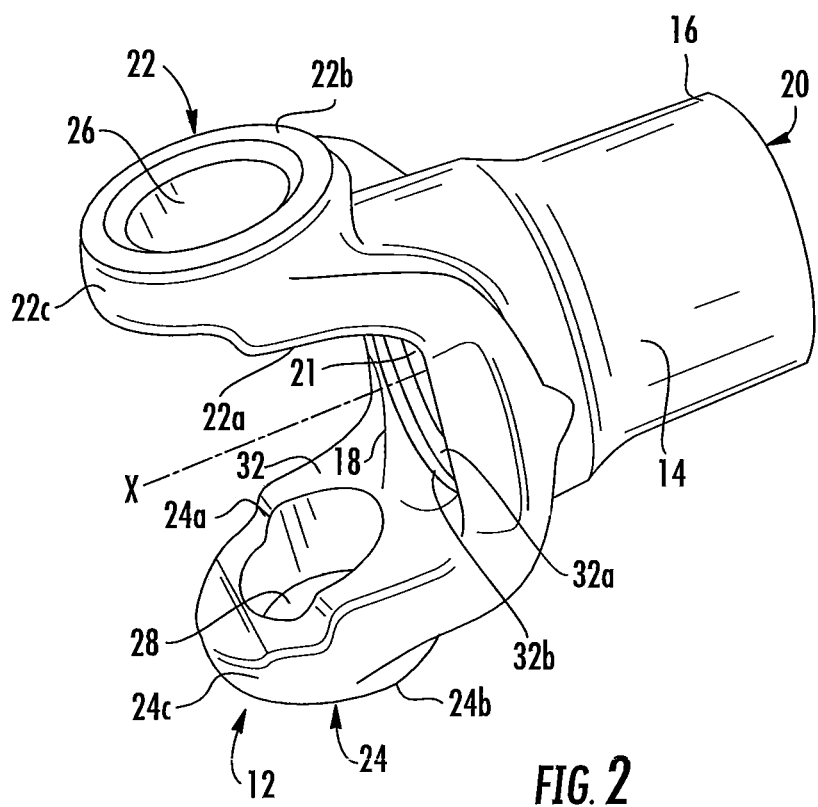
FIG. 2 is a perspective view of a preferred embodiment of a female member of the joint assembly of FIG. 1.

In some embodiments, as depicted in FIG. 2, the female member 12 includes a hollow cylindrical body 14 rotatable along a longitudinal axis X. The cylindrical body 14 has a radially outer cylindrical surface 16, first axial end 18 and a second axial end 20.

A bore 21 extends from the first axial end 18 to the second axial end 20. The bore 21 provides a radially inner cylindrical surface to the body portion 14. The inner cylindrical surface has a set of splines thereon. In some embodiments, the splines (not pictured) extend longitudinally along the length of the bore 21 from the first axial end 18 to the second axial end 20. In some embodiments, the female member 12 can also be, but is not limited to, a cardan yoke or constant velocity joint.

In some embodiments, the female member 12 includes a pair of opposing, spaced apart lug ears 22, 24 extending from the first axial end 18 away from the body 14 as depicted in FIGS. 1-2. The lug gears 22, 24 are spaced apart from each other by approximately 180 degrees. Each lug ear 22, 24 is attached to the body 14 and extends in a generally axial direction from the body 14. Preferably, the lug ears 22, 24 are formed in a unitary fashion with the body portion 14.

In some embodiments, each lug ear 22, 24 has a generally cylindrical opening 26, 28 formed therethrough. The openings 26, 28 are coaxial with one another. Each lug ear 22, 24 includes an inner 22a, 24a and outer surface 22b, 24b. The inner surfaces 22a, 24a extend from each opening 26, 28 to a set of annular grooves 32a, 32b. The outer surfaces 22b, 24b extends from an opposite end of each opening 26, 28 to the body 14. The inner surfaces 22a, 24a and outer surfaces 22b, 24b extend in opposite direction from each opening 26, 28 to the body portion 14. The inner surfaces 22a, 24a face each other and separate the outer surfaces 22b, 24b from each other. A pair of side surfaces 22c, 24c are provided between the inner surfaces 22a, 24a and the outer surfaces 22b, 24b As shown in FIG. 2, in some embodiments, the inner surfaces 22a, 24a, of female member 12 includes a connecting portion 32 that connects the body portion 14 with the lug ears 22, 24. The connecting portion 32 has an inner surface with the annular grooves 32a, 32b formed on the outer surface thereof. In some embodiments, the annular grooves 32a, 32b are of a gradually increasing diameter from the first axial end 18 to the lug ears 22, 24. In some embodiments, the connecting portion 32 and the lug ears 22, 24 form a generally U-shaped end to the female member 12.

Figure 4A:
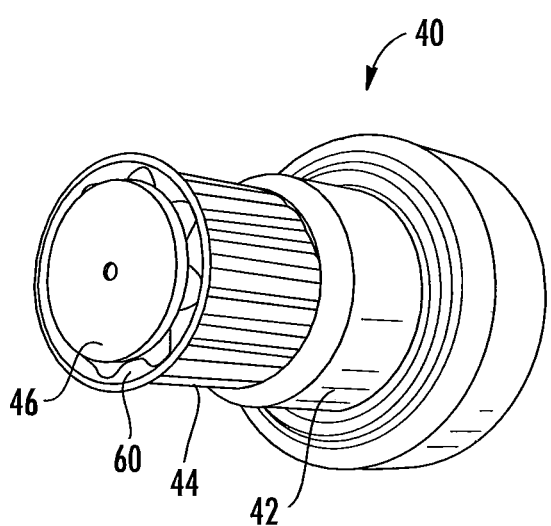
FIG. 4a is a perspective view of a male splined member of the joint assembly of FIG. 1 with the retaining member of FIG. 3 on the end thereof.
Figure 4B:
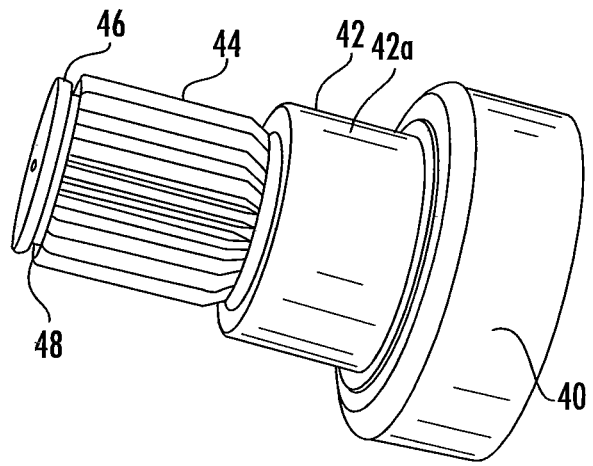

In some embodiments, as shown in FIGS. 4a and 4b the male member 40 is a shaft having a first axial end portion 42, a second axial end portion 46, connected by a tubular portion 44. The tubular portion 44 has an outer splined surface. The male member 40 can be, but is not limited to, a pinion shaft, midship tube shaft, tube shaft, constant velocity joint stub shaft, transmission shaft or similar shaft. The first axial end portion 42 has generally a tubular shape.

In some embodiments, the first axial end portion 42 is a non-splined portion. In some embodiments, the first axial end portion 42 has a reduced diameter portion 42a connected to the splined portion 44. The reduced diameter portion 42a is non-splined and has a diameter larger than the diameter of the splined portion 44.

In some embodiments, the second axial end portion 46 has a smaller diameter than the reduced diameter portion 42a of the first axial end portion 42 and the splined portion 44. A retaining feature or circumferential groove 48 is positioned between the splined portion 44 and the second axial end portion 46 on the outer surface of the male member 40.

During assembly of the joint assembly 10, the bore 21 of the female member 12 receives and interconnects with the splined portion 44 of the male member 40 as shown in FIG. 1. The splined portion 44 of the male member 40 extends through the second axial end 20 of the female member 12 and ends adjacent the first axial end 18. The splines of the bore 21 mate with the splines on the splined portion 44 of the male member 40 to lock together the male member 40 and female member 12 and allowing the female member 12 and male member 40 to rotate together.

As shown in FIG. 1, when the male member 40 is inserted into the bore 21 of the female member 12, the second axial end 20 of the female member 12 abuts or nearly abuts the edge of the reduced diameter portion 42a providing a stopping point for the insertion of the male member 40 into the female member 12. In some embodiments, a sealing ring, preferably an O-ring, is inserted between the second axial end 20 of the female member and the reduced diameter portion 42a of the male member 40.

During assembly of the joint assembly 10, a retaining member 60 can be placed within the inside groove 32a in the connecting portion 32 of the female member 12 as shown in FIG. 1.

Figure 3:
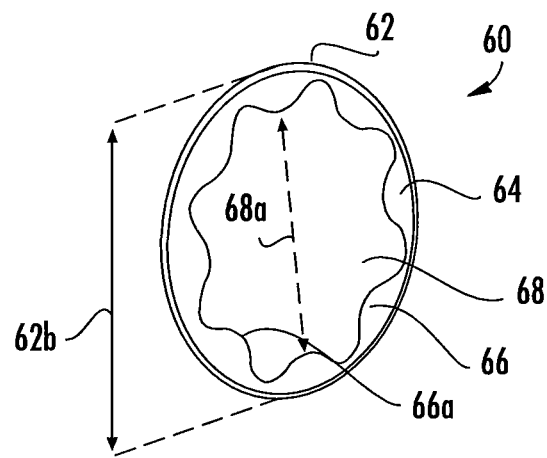
FIG. 3 is a perspective view of a preferred embodiment of a retaining member.

In one embodiment, the retaining member 60 is a retention ring having a generally ring shape with an annular portion 62 and a flat surface portion 64 as shown in FIG. 3. The annular portion 62 extends perpendicular to the surface portion 64. The annular portion 62 has an outer diameter 62b. The flat surface portion 64 includes attachment features or teeth 66 extending radially inward from and perpendicular to the annular portion 62. In one embodiment, as shown in FIG. 3, the teeth 66 have a relatively straight edge portion 66a. The teeth 66 define an aperture 68 in the flat surface portion 64 of the retention ring 60. The aperture 68 has an inner diameter 68a. The inner diameter 68a is sized to nearly match, but clear the diameter of the circumferential groove 48 of the male member 40 and to allow the second axial end portion 46 of the male member 40 to fit through the aperture 68 during assembly. The retention ring 60 can be made of materials including, but not limited to, spring steel, low carbon steel, hardened steel, polycarbonate, or acrylonitrile butadiene styrene.

During assembly of the joint assembly 10, the retention ring 60 is inserted into the connecting portion 32 of the female member 12 such that the flat surface portion 64 faces axially toward the first end portion 18 and the annular portion 62 fits into an annular groove 32a of the connecting portion 32. The outer diameter 62a of the annular portion 62 is sized to fit the diameter of the groove 32a and inner diameter 68a of aperture is designed to allow the retention ring 60 to securely fit into the groove 48 of the male member 40 and remain in that position once assembled.

Once the retention ring 60 is placed into the female member 12, the second axial end portion 46 of the male member 40 is placed through the aperture 68 of the retention ring 60. The teeth 66 fit around the second axial end portion 46 and extend into the groove 48 of the male member 40 as shown in FIGS. 1 and 4a. The retention ring 60 axially locks the male member 40 with the female member 12 in a pop-on interlocking connection without requiring the use of any fastener tooling or excessive force.

Figure 5:
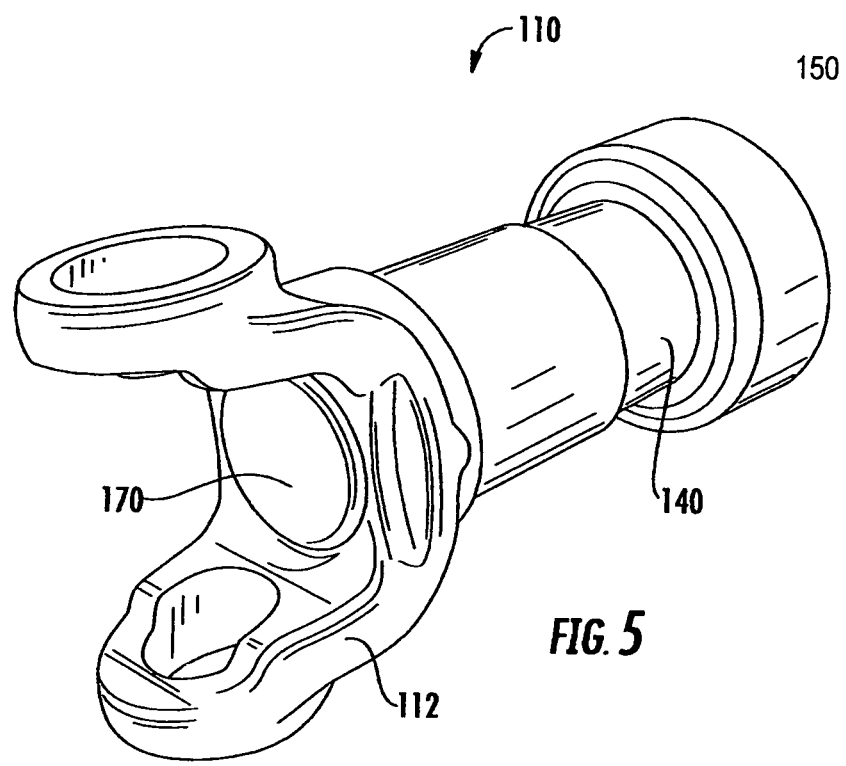
FIG. 5 is a perspective view of another preferred embodiment of a joint assembly.
Figure 6:
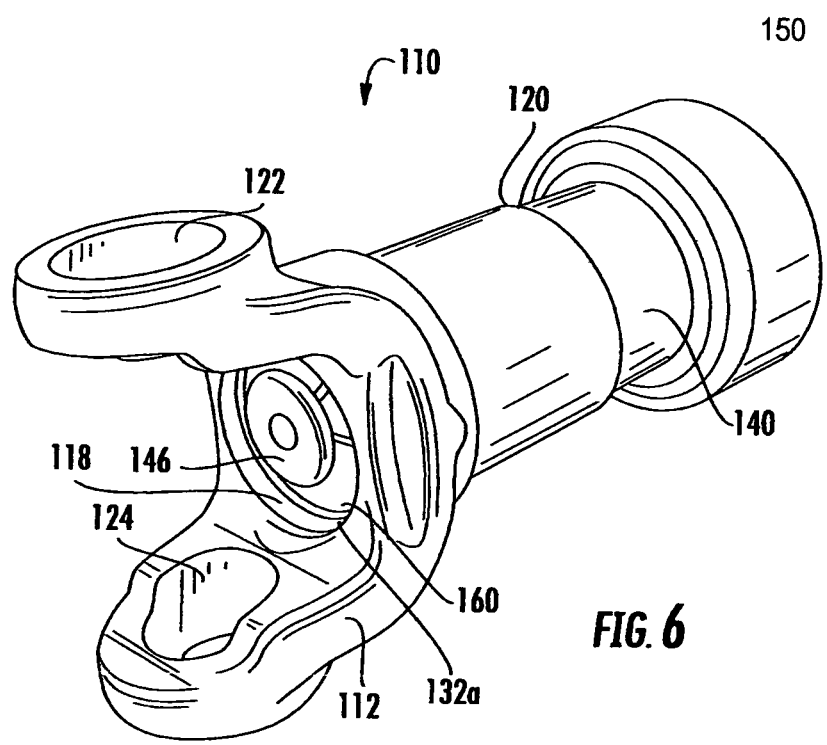
FIG. 6 is a perspective view of the joint assembly of FIG. 5 with the sealing plug removed.
Figure 7:
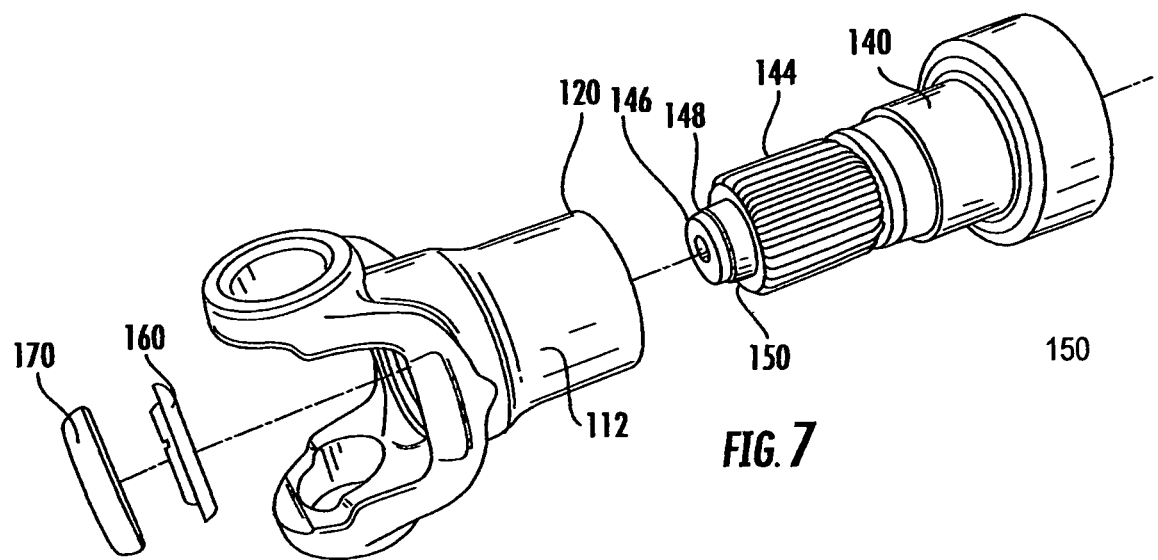
FIG. 7 is an exploded view of the joint assembly of FIG. 5.
Figure 8:
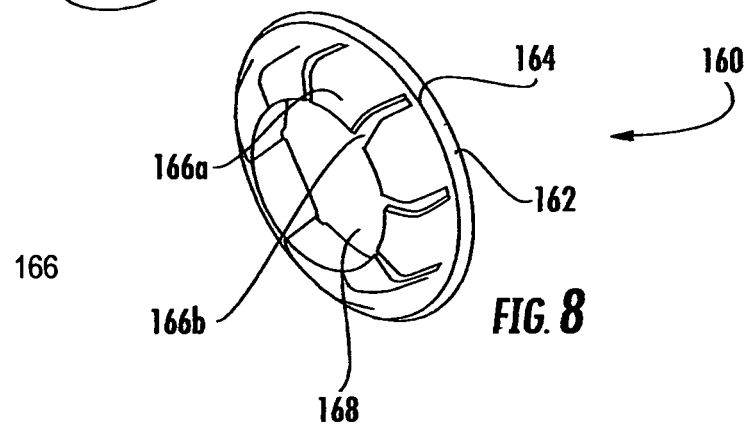
FIG. 8 is a perspective view of another preferred embodiment of a retaining member.
Figure 9:
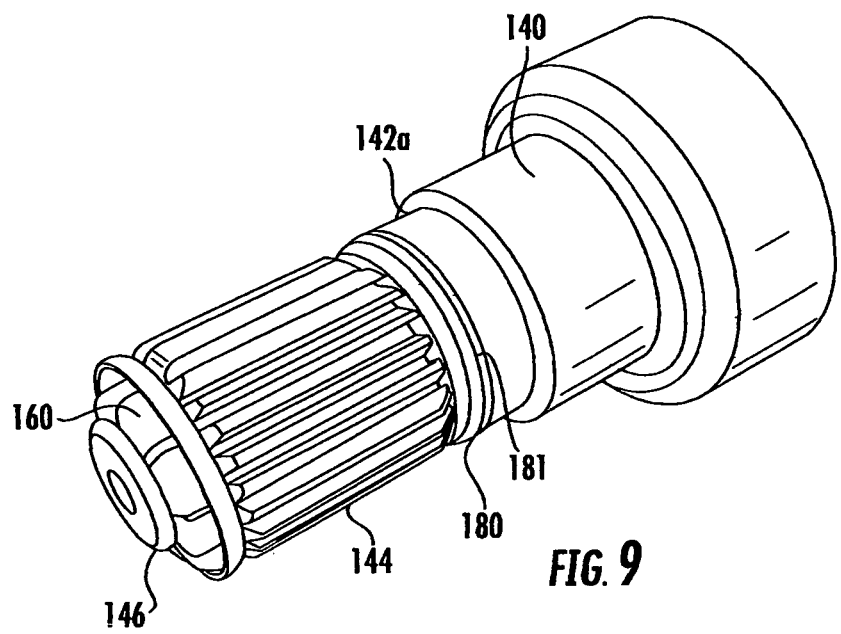
FIG. 9 is a perspective view of a male splined member of the joint assembly of FIG. 5 with the retaining member of FIG. 8 on the end thereof.

FIGS. 5-9 depict another preferred embodiment of a joint assembly 110. Unless noted, the joint assembly 110 is substantially similar to the joint assembly 10 of the first preferred embodiment and similar reference numbers are used to indicate similar features and/or components. As shown in FIGS. 7 and 9, the male member 140 has a non-splined portion 150 between the second axial end portion 146 and the splined portion 144. The non-splined portion 150 has a diameter smaller than the diameter of the splined portion 144 and has a retaining feature or circumferential groove 148 positioned along the non-splined portion 150 between the splined portion 144 and the second axial end portion 146.

The bore 121 of the female splined member or female member 112 receives and interconnects with the splined portion 144 of the male member 140 as shown in FIG. 5. The splined portion 144 of the male member 140 extends through the second end 120 of the female member 112 and ends adjacent the first end 118. The splines of the bore 121 mate with the splines on the splined portion 144 of the male member 140 to lock together the male member 140 and female member 112 and allowing the female member 112 and male member 140 to rotate together.

During assembly of the end yoke assembly 110, a retaining member 160, as shown in FIG. 6, is placed within the inside groove 132a in the connecting portion 132 of the female member 112.

In one embodiment, as shown in FIG. 8, the retaining member 160 has an annular portion 162 with a substantially flat surface portion 164. The annular portion 162 circumferentially extends perpendicular to a radially outer edge of the flat surface portion 164. The annular portion 162 has an outer diameter 162b. The flat surface portion 164 includes attachment features or tabs 166 that extend perpendicular to the flat surface portion 164 circumferentially along the radially inner edge thereof. The annular portion 162 and the tabs 166 extend in the same direction from the flat surface portion 164.

In some embodiments, the tabs 166 have bent end portions 166a that extend radially inward from the end of the tabs 166 opposite the flat surface portion 164, thereby providing an apertures 168. The diameter of the apertures 168 is smaller than the diameter of the annular portion 162b and is designed so that apertures 168 mates with the circumferential groove 148 of the male member 140. A set of apertures or slots 166b are created by the positioning of the tabs 166 circumferentially around the flat surface portion 164. The bent end portions 166a of multiple tabs 166 and the slots 166b provide the retaining member 160 flexibility allowing the second axial end portion 146 of the male member 140 to fit through the apertures 168. The retaining member 160 can be made of materials including, but not limited to, spring steel, low carbon steel, hardened steel, polycarbonate, or acrylonitrile butadiene styrene.

The diameter of the annular portion 162 is designed to mate with the female member 112 such that the retaining member 160 is placed in the groove 132a of the connecting portion 130 of the female member 112 and the second axial end portion 146 of the male member 140 fits inside the apertures 168.

Once the retention ring 160 is placed into the groove 132a of the female member 112, the second axial end portion 146 of the male member 140 is placed through the apertures 168 of the retaining member 160. The end portions 164a of the multiple tabs 166 fit around the second axial end portion 146 and extend into the groove 148 in the male member 140 as shown in FIG. 9. The retaining member 160 axially locks the male member 140 with the female member 112 through manual force in a pop-on interlocking connection.

In some embodiments, as shown in FIGS. 5 and 9, a sealing plug 170 is placed over the connecting portion 132 of female member 112 such that the sealing plug 170 covers the retaining member 160 and the second axial end portion 146 of the male member 140. The sealing plug 170 prevents lubricant from leaking out and seals against contaminants. The sealing plug 170 can be, but is not limited to, a welch plug.

In some embodiments, the sealing plug 170 can include a body portion 170a that extends away from the flange portion 170b. In one embodiment, the shape of the sealing plug 170 is generally flat or slightly domed in shape. Preferably, the plug 170 is formed from a relatively strong, rigid material, such as a metallic or plastic material. The sealing plug 170 can be formed by any suitable method, such as a stamping.

In some embodiments, the male member 140 includes a groove 180 in the reduced diameter portion 142a for receiving a sealing ring 181, preferably an O-ring, interposed between the second end 120 of female member 112 and the reduced diameter portion 142a of the male member 140 to exclude dirt, contaminants, etc. from the splines of female member 112 and male member 140.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed:

1. A connecting joint assembly, comprising:
   a female member having a first axial end, a second axial end, and a cylindrical body portion extending between the first axial end and the second axial end, wherein the cylindrical body portion includes a bore having a splined radially inner surface;
   a male member having a first axial end portion, a second axial end portion, a splined tubular portion extending between the first axial end portion and the second axial end portion, and a circumferential groove formed between the splined tubular portion and the second axial end portion on the outer surface of the male member; and
   a retaining member including an annular portion and a plurality of attachment features extending radially inward from and, perpendicular to, the annular portion defining an aperture,
   wherein the first axial end of the female member has an annular groove formed in an inner surface thereof, wherein the second axial end portion of the male member has a circumferential groove on the outer surface thereof, wherein the splined radially inner surface of the female member and the splined tubular portion of the male member meshingly engage, wherein the second axial end portion of the male member extends through the aperture of the retaining member, and wherein the attachment features of the retaining member extend into the circumferential groove of the male member and the annular portion of the retaining member extends into the annular groove of the female member.

2. The connecting joint assembly of claim 1, wherein the attachment features are a plurality of teeth having a flat edge portion on the radially inner most part thereof.

3. The connecting joint assembly of claim 2, wherein the teeth form a scallop pattern.

4. The connecting joint assembly of claim 1 further comprising a sealing plug placed around the retaining member and the second axial end portion of the male member.

5. The connecting joint assembly of claim 1, wherein the male member includes a non-splined portion axially between the splined portion and the first axial end portion, wherein the non-splined portion has a diameter larger than the diameter of the splined portion.

6. The connecting joint assembly of claim 5, wherein the second axial end of the female member abuts the non-splined portion of the male member.

7. The connecting joint assembly of claim 6, wherein a sealing ring is positioned between the second axial end of the female member and the non-splined portion of the male member.

8. The connecting joint assembly of claim 1, wherein the female member is an end yoke.

9. The connecting joint assembly of claim 1, wherein the female member includes a pair of opposing spaced apart lug ears extending in a generally axial direction from the first axial end away from the cylindrical body portion.

10. The connecting joint assembly of claim 9, wherein at least one of the lug ears includes a generally cylindrical opening formed therethrough, and wherein the opening is formed perpendicular to the bore formed in the female member.

11. A connecting joint assembly, comprising:

a female member having a first axial end, a second axial end, and a cylindrical body portion extending between the first axial end and the second axial end, wherein the cylindrical body portion includes a bore having a splined radially inner surface;

a male member having a first axial end portion, a second axial end portion, a splined tubular portion extending between the first axial end portion and the second axial end portion, a circumferential groove formed between the splined tubular portion and the second axial end portion on an outer surface of the male member; and a retaining member including an annular portion, a flat surface portion and a plurality of attachment features, wherein the annular portion extends perpendicular to the flat surface portion along the radially outer edge thereof and the attachment features extend perpendicular to the flat surface portion along the radially inner edge thereof and define an aperture, wherein the first axial end of the female member has an annular groove formed in an inner surface thereof, wherein the splined radially inner surface of the female member and the splined tubular portion of the male member meshingly engage, wherein the second axial end portion of the male member extends through the aperture of the retaining member, and wherein the attachment features of the retaining member extend into the circumferential groove of the male member and the annular portion of the retaining member extends into the annular groove of the female member.

12. The connecting joint assembly of claim 11, wherein the attachment features are a plurality of circumferentially spaced tabs, each tab having a bent end portion extending radially inward from the end of tab opposite the flat surface portion.

13. The connecting joint assembly of claim 12, wherein the bent end portions extend into the circumferential groove of the male member.

14. The connecting joint assembly of claim 12, wherein the retaining member further comprises a plurality of circumferentially spaced slots positioned between each of the tabs.

15. The connecting joint assembly of claim 11, further comprising a sealing plug placed around the retaining member and the second axial end portion of the male member.

16. The connecting joint assembly of claim 15, wherein the second axial end of the female member abuts the non-splined portion of the male member.

17. The connecting joint assembly of claim 15, wherein a sealing ring is positioned between the second axial end of the female member and the non-splined portion of the male member.

18. The connecting joint assembly of claim 11, wherein the male member includes a non-splined portion axially between the splined portion and the first axial end portion, wherein the non-splined portion has a diameter larger than the diameter of the splined portion.

19. The connecting joint assembly of claim 11, wherein the female member includes a pair of opposing spaced apart lug ears extending in a generally axial direction from the first axial end away from the cylindrical body portion.

20. The connecting joint assembly of claim 19, wherein at least one of the lug ears includes a generally cylindrical opening formed therethrough, and wherein the opening is formed perpendicular to the bore formed in the female member.

* * * * *

UNITED STATES PATENT AND TRADEMARK OFFICE
CERTIFICATE OF CORRECTION

PATENT NO. : 11,300,162 B2
APPLICATION NO. : 16/311252
DATED : April 12, 2022
INVENTOR(S) : Corpus et al.

It is certified that error appears in the above-identified patent and that said Letters Patent is hereby corrected as shown below:

On the Title Page

Column 1, (72) Inventors: Address for Bao T. Luong, should read "Lambertville, MI (US)"

Signed and Sealed this
Thirteenth Day of September, 2022

Katherine Kelly Vidal
*Director of the United States Patent and Trademark Office*